W. T. FRAZIER, E. H. BREWSTER & J. M. HOPFENBECK.
MILK PAIL.
APPLICATION FILED OCT. 22, 1910.
992,953.
Patented May 23, 1911.
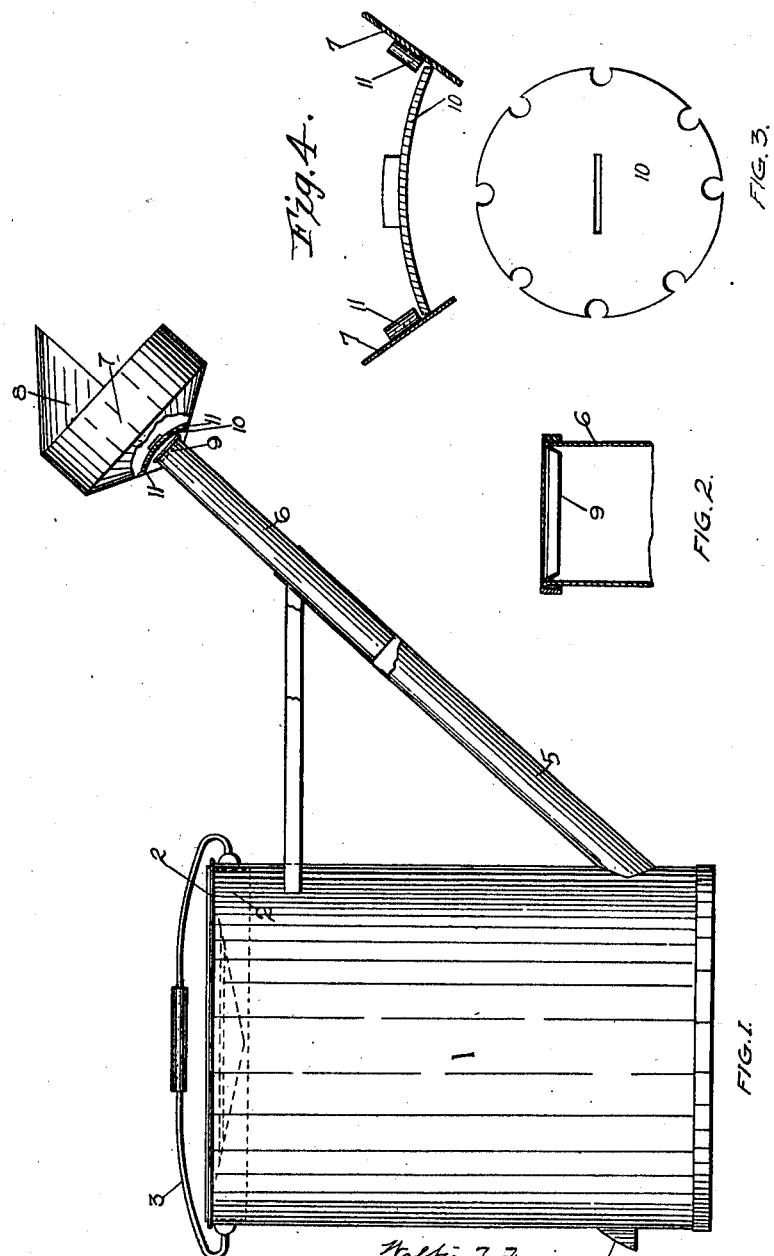

UNITED STATES PATENT OFFICE.

WALTER T. FRAZIER, EDWIN H. BREWSTER, AND JOHN M. HOPFENBECK, OF SALT LAKE CITY, UTAH.

MILK-PAIL.

992,953. Specification of Letters Patent. Patented May 23, 1911.

Application filed October 22, 1910. Serial No. 588,558.

*To all whom it may concern:*

Be it known that we, WALTER T. FRAZIER, EDWIN H. BREWSTER, and JOHN M. HOPFENBECK, citizens of the United States, residing at Salt Lake City, in the county of Salt Lake and State of Utah, have invented certain new and useful Improvements in Milk-Pails, of which the following is a specification.
The purpose of our invention is to provide a milk pail, that is sanitary and easily kept so, and one that may be used as a stool for the milker. These objects we accomplish by the device illustrated in the accompanying drawings, in which similar figures of reference indicate like parts throughout the several views.

Figure 1, is a vertical elevation, parts in sections. Fig. 2, is an enlarged section of the strainer. Fig. 3, is an enlarged plan of the strainer cap. Fig. 4, is an enlarged section of the strainer cap.

As is well known, the unwholesomeness of much of the milk used and offered for sale is due to the dirt and bacteria that get into the milk as it is being drawn from the cow and strained and cared for at the milking place.

It is our purpose to provide a milk pail, into which the minimum amount of bacteria, carried as dust in the air, can enter; and none of the heavier particles of dirt can fall or be carried into the milk while it is being handled in the milking place. This we have done in our milk pail 1, which is fitted with closure 2, purposely horizontal with said pail, or a part of it below the plane or the main part of said closure, to attach a handle thereon and to permit the milker to use said pail as a stool. The pail is fitted with a bail 3, and a tipping handle 4. On the side of the pail opposite said tipping handle is attached a spout 5, cylindrical in form. In this spout is slidably fitted the lower end of the milk receiving spout 6, which has firmly secured thereon and near the upper end thereof an enlarged receiver 7, which is cylindrical in form and has a funnel shaped closure as its bottom, and which is concentrically soldered to said milk receiving spout a short distance from its upper end. Said receiver 7, has a hood 8 secured thereon which closes one half of said receiver 7. The milking is done through the uncovered portion. A removable strainer 9 is fitted over the upper end of said milk receiving spout. Said strainer is made by covering one end of a band with fine wire cloth and is made removable so that it may be more easily cleansed. In the lower end on the funnel shaped bottom of said receiver 7, is removably fitted a concavo-convex cap 10, which has portions of its periphery cut out to allow it to pass lugs 11, which are attached to the inner side of said funnel shaped bottom. More of said openings in the periphery of said cap 10 are provided than is necessary to pass said lugs, for the purpose of providing free passage for the milk around said cap 10 and into the pail through the milk receiving spout 6. The upper end of said milk receiving spout 6 extending as it does slightly above the lower end of the funnel shaped bottom forms a lodging place for any particles of foreign matter, and a retainer for said strainer 9. The said cap 10 covering as it does the opening into said strainer and positioned a short distance above it prevents the stream of milk from driving foreign matter of a solid nature through said strainer and into the milk. The telescoping of the milk receiving spout 6 into the spout 5, permits the adjustment of the milk receiver to the udder of the cow or into convenient proximity thereto for milking.

Having thus described our invention we desire to secure by Letters Patent and claim as novel:

In a milk pail the combination of a pail, a flat closure therefor, a tipping handle, a spout opposite thereto, a milk receiving spout slidably fitted in the upper portion of said spout, a removable strainer adapted to fit over the end of said milk receiving spout, a removable cap positioned above said strainer, a partially covered milk receiver having a funnel shaped bottom, and lugs secured thereto adapted to hold said cap.

In testimony whereof we have affixed our signatures in presence of two witnesses.

WALTER T. FRAZIER.
EDWIN H. BREWSTER.
JOHN M. HOPFENBECK.

Witnesses:
SAM RANEY,
W. R. WILLIAMS.

Copies of this patent may be obtained for five cents each, by addressing the "Commissioner of Patents, Washington, D. C."